Figure 1:
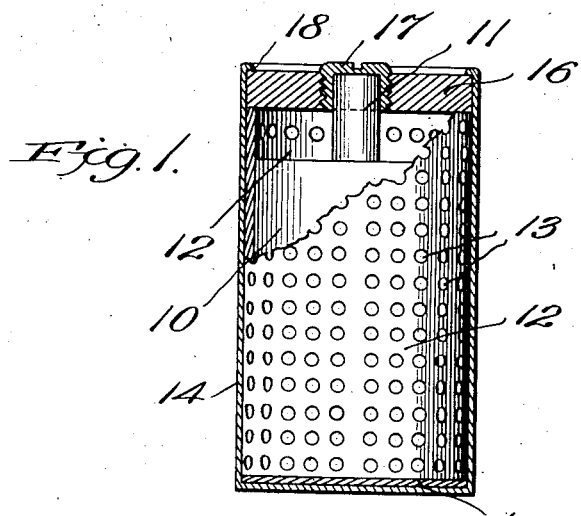

H. M. KORETZKY.
DRY BATTERY CELL.
APPLICATION FILED SEPT. 18, 1919.

1,395,282.

Patented Nov. 1, 1921.

Harry M. Koretzky
Inventor

By his Attorney

UNITED STATES PATENT OFFICE.

HARRY M. KORETZKY, OF NEW YORK, N. Y.

DRY BATTERY-CELL.

1,395,282.  Specification of Letters Patent.  Patented Nov. 1, 1921.

Application filed September 18, 1919. Serial No. 324,568.

*To all whom it may concern:*

Be it known that I, HARRY M. KORETZKY, a citizen of the United States, residing in New York city, State of New York, have invented a certain Improvement in Dry Battery-Cells, of which the following is a specification.

My present invention relates to an improved form of dry cell for electric batteries particularly adapted for use in portable electric flash lights, telephone equipment and the like, although capable of use in many other connections.

The principal object of my invention is the provision of a novel form of battery cell which shall be ready for use as soon as water or a suitable solution is applied to the same, while capable of being kept indefinitely in storage without deterioration while in the dry state. Another object of the invention is the provision of a novel form of cell which lends itself to easy manufacture with a minimum of hand labor. Another object of the invention is the provision of a form of cell wherein a space is provided for absorption or accommodation of the gases generated in the electrolyte during cell activity, thereby preventing dangerous accumulation of pressure tending to swell or even to burst the cell. Other objects and advantages will appear in the following detailed specification.

It has been customary hitherto to apply to a part of the length of the central (generally carbon) electrode a body of moist depolarizing mixture which is secured in place by a textile wrapping bound around the same. The second electrode takes the form of a zinc cup within which the carbon electrode with its covering of depolarizing mixture is introduced, together with a suitable electrolyte; the whole being inclosed air tight by means of a sealing material in the mouth of the cup, above which the extremity of the carbon electrode protrudes.

In the ordinary and well known forms of so-called "dry" batteries commonly used for portable electric lights and like applications, the contents of the cell is sealed up in moist condition and the cell is ready for use at once. In cells of this kind two disadvantages are met with which it is the object of my present invention to avoid.

One of these is found in the fact that local electric action within the cell is inevitable, even when the external circuit is open. In consequence batteries so made, when kept for a long time before being put into use, are subject to certain deterioration unless promptly used. Where cells are intended for shipment to distant points, this disadvantage becomes very important.

In the second place, cells of this character, especially when overworked, generate gases which, being confined closely by the sealing material, often swell and distort, and sometimes burst the outer cup.

The first of the above disadvantages is avoided by my invention by the provision of means for holding the electrolyte permanently in place in perfectly dry condition while supplying means whereby water or a suitable solution may be easily introduced into the cell just before it is intended to use it. This avoids all deterioration during prolonged storage or periods of shipment in the dry state, since there can be no internal local action without moisture.

In order to obviate the second disadvantage above set forth, my improved cell is made so as to provide adequate space for the accommodation of the generated gases, whereby the creation of a dangerously high pressure is avoided.

Figure 2:
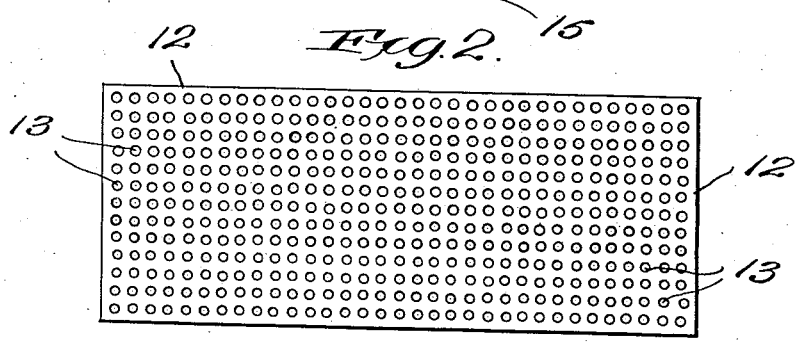
Figure 3:
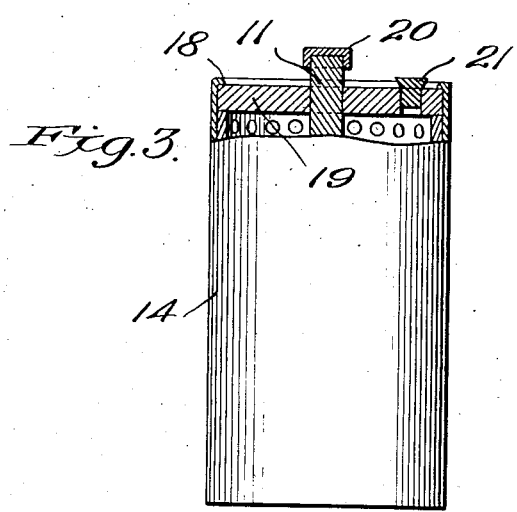

My invention may be embodied in a great variety of forms two of which are illustrated by way of example in the accompanying drawings wherein Figure 1 is a central vertical section of a cell made in accordance with my invention, Fig. 2 is a development of any preferred electrolyte carrier, and Fig. 3 is a side elevation, partly in section of a modified form of cell.

Instead of binding the depolarizing mixture to the central electrode by means of cloth as hitherto practised, I mold a moist and plastic depolarizing mixture in a body 10 of suitable diameter around the carbon electrode 11 and then harden this body in place by drying the same. This forms what may be called a core of a conducting and depolarizing nature, which is adapted to be surrounded by the electrolyte to form an electric cell.

The electrolyte is kept in place by means of a carrier surrounding the core closely. This carrier preferably takes the form of a sheet 12 of blotting paper, heavy cloth, or other suitable absorbent material of a sufficiently resistant nature, which sheet is provided with perforations 13, which may be circular as shown or may be otherwise shaped.

Within these openings is packed a plastic electrolytic mixture (such as zinc chlorid and sal ammoniac) after which the whole is heated until the moisture is driven off, leaving only the dry reagents in the carrier.

This carrier, thus charged may be wrapped around the body 10 which is then slipped into the zinc cup 14 and down onto the usual absorbent washer 15 at the bottom of the same. Or the cup can be lined with the charged carrier and the core be then slipped into place, as shown in Fig. 1.

In order to seal the battery in a manner to leave the necessary gas space, and to facilitate introduction of water at the proper time I prefer the construction shown in Fig. 1. Here the carrier is made wide enough to extend some distance above the top of the body 10, thus forming a shoulder at its upper edge upon which is pressed the thick insulating washer 16, preferably made of fiber.

The washer 16 is provided with a central aperture with an interior screw thread which is large enough to pass over the end of the electrode 11 while leaving a considerable space around the same through which water may be poured when it is desired to prepare the cell for use.

When the cell is in use, this opening is closed by means of a conducting cap 17, preferably of brass, which has an exterior thread enabling it to be screwed into the aperture in the washer 16. This cap is screwed down firmly upon the top of the electrode 11, and forms the central external pole or terminal of the cell. In order that the washer 16 and the parts carried by it may be firmly secured in place I spin over the edge of the cap as shown at 18 in Fig. 1.

The space between the body 10 and the washer 16 may either be left empty, when it will serve simply to store the gases generated; or it may be more or less filled with powdered charcoal or other gas-absorbing substance, in which case a protective washer will be used to keep the charcoal from finding its way into the lower part of the cell.

A cell made in this manner may be left for an indefinite period upon the shelves before, during or after shipment to the retail dealer, without any deterioration whatever. When it is to be used, the cap 17 is unscrewed, water introduced, and the cap screwed firmly back into place.

After partial use of the cell, and in case it has been permitted to dry out during disuse, the cell may be revived or restored by a renewed application of water. Certain features of the invention are independent of the use of a carrier for the electrolyte, and, indeed, certain features of the invention may be employed with electrolyte used in the usual moist form, and I have so claimed the features in question.

In Fig. 3 is shown a modified form of the invention, wherein the carbon electrode is furnished with a simple metal cap, pressed upon the top thereof in the usual manner. Here the closing washer 19 fits closely around the electrode 11 and should be applied before applying the metal cap or terminal 20. In order to permit of introducing the water, a small plug 21 may be used in connection with a suitable feeding opening in the washer.

Various changes may be made in my device without departing from the scope of my invention, and I do not limit myself to the details herein shown and described.

What I claim is:

1. In a battery cell, an external cup-shaped electrode, an internal core comprising the second electrode, a carrier between the core and cup and in contact with both, a dry electrolyte carried by said carrier, and sealing means for the cell.

2. A battery cell of the general character set forth in claim 1 hereof comprising a flexible carrier wound around the core.

3. A battery cell of the general character set forth in claim 1 hereof wherein the carrier is composed of a sheet having perforations containing the electrolyte.

4. A battery cell of the general character set forth in claim 1 hereof wherein the carrier is composed of a sheet of absorbent material provided with perforations containing the electrolyte.

5. A battery cell of the general character set forth in claim 1 hereof wherein the sealing means comprises a washer secured in the mouth of the cup, said washer having a feeding aperture and means for closing the same.

6. In a battery cell of the general character set forth in claim 1 hereof having an external cup forming one electrode, a closing washer secured in the mouth of the cup over a space adapted to accommodate the gases generated within the cell during its use.

7. The structure set forth generally in claim 6 hereof wherein the closing washer is provided with a feeding aperture and closing means therefor.

8. The structure set forth generally in claim 6 hereof wherein the closing washer is secured in place by spinning over the edge of the cup.

9. In a battery cell having a cup-shaped outer electrode and a central electrode therein; a washer secured in the mouth of said cup and having a threaded opening surrounding said central electrode, and a metal cap having a thread fitting the threaded opening in said washer and adapted to be screwed down against said central electrode to form one of the terminals of the cell.

In testimony whereof I have hereto set my hand on this 13th day of September, 1919.

HARRY M. KORETZKY.